(12) United States Patent
Yang et al.

(10) Patent No.: US 8,865,332 B2
(45) Date of Patent: Oct. 21, 2014

(54) NICKEL-HYDROGEN BATTERY PACK HEAT REMOVAL SYSTEM FOR HYBRID VEHICLE

(75) Inventors: Yalian Yang, Chongqing (CN); Xin Zhang, Chongqing (CN); Datong Qin, Chongqing (CN); Yong Ren, Chonqing (CN); Anjian Zhou, Chongqing (CN); Minghui Hu, Chongqing (CN); Ling Su, Chongqing (CN); Chuanlin Zhao, Chongqing (CN)

(73) Assignee: Chongqing Changan Automobile Co., Ltd., Chongqing (CN)

( * ) Notice: Subject to any disclaimer, the term of this patent is extended or adjusted under 35 U.S.C. 154(b) by 465 days.

(21) Appl. No.: 12/999,582

(22) PCT Filed: Jan. 16, 2009

(86) PCT No.: PCT/CN2009/070171
§ 371 (c)(1),
(2), (4) Date: Dec. 16, 2010

(87) PCT Pub. No.: WO2009/152698
PCT Pub. Date: Dec. 23, 2009

(65) Prior Publication Data
US 2011/0111272 A1 May 12, 2011

(30) Foreign Application Priority Data
Jun. 20, 2008 (CN) .......................... 2008 1 0069859

(51) Int. Cl.
*H01M 10/50* (2006.01)
(Continued)

(52) U.S. Cl.
CPC ......... *H01M 10/5004* (2013.01); *B60L 3/0046* (2013.01); *Y02E 60/124* (2013.01);
(Continued)

(58) Field of Classification Search
USPC ........................................ 429/62, 96, 99, 120
See application file for complete search history.

(56) References Cited

U.S. PATENT DOCUMENTS 5,879,833 A * 3/1999 Yoshii et al. ..................... 429/62
6,211,646 B1 * 4/2001 Kouzu et al. ................... 320/107
(Continued)

FOREIGN PATENT DOCUMENTS

CN 1196307 10/1998
CN 2505322 8/2002
(Continued)

OTHER PUBLICATIONS

PCT International Search Report issued in International Application No. PCT/CN2009/070171, mailed on Apr. 23, 2009.
(Continued)

*Primary Examiner* — Muhammad Siddiquee
(74) *Attorney, Agent, or Firm* — Fulbright & Jaworski LLP

(57) ABSTRACT

A nickel-hydrogen battery pack heat removal system for hybrid vehicle is provided. The system includes a battery box, a power battery pack (8), a battery support frame (9), a support bar (5), an air inlet (1), an air outlet (6) and a fan (7). Batteries in the power battery pack (8) are aligned in parallel in two layers one above the other in the battery support frame (9) of the battery box, and the support bar (5) and the battery support frame (9) are fixed on the upper and lower soleplates respectively of the battery box. The air inlet (1) is set at one end of the battery box, the air outlet (6) is set at the other end of the battery box, and the fan (7) is fitted at the air outlet (6). The system further includes conduction plates (2) in the shape of circular arcs, said conduction plates (2) being fitted on the opposing faces of the two upper and lower batteries which are closest to the air inlet (1).

14 Claims, 2 Drawing Sheets

(51) Int. Cl.
  *B60L 3/00*       (2006.01)
  *H01M 10/6563*    (2014.01)
  *B60L 11/18*      (2006.01)
  *H01M 10/613*     (2014.01)
  *H01M 10/30*      (2006.01)
  *H01M 10/625*     (2014.01)
  *H01M 10/617*     (2014.01)
  *H01M 10/635*     (2014.01)
  *H01M 2/10*       (2006.01)
  *H01M 10/6566*    (2014.01)

(52) U.S. Cl.
  CPC ...... *H01M 10/5067* (2013.01); *B60L 11/1874* (2013.01); *H01M 10/30* (2013.01); *H01M 10/5016* (2013.01); *H01M 10/5008* (2013.01); *H01M 10/5024* (2013.01); *H01M 2/105* (2013.01); *H01M 10/5073* (2013.01); *Y02T 10/7055* (2013.01); *Y02T 10/7005* (2013.01)
  USPC ........................................................ 429/120

(56) References Cited

U.S. PATENT DOCUMENTS

| | | | | |
|---|---|---|---|---|
| 6,340,877 | B1 * | 1/2002 | Mita et al. | 320/112 |
| 6,498,406 | B1 | 12/2002 | Høriuchi et al. | 307/150 |
| 2005/0058892 | A1 * | 3/2005 | Ovshinsky et al. | 429/120 |
| 2007/0238015 | A1 | 10/2007 | Kubota et al. | 429/120 |
| 2008/0003495 | A1 | 1/2008 | Shimizu | 429/99 |
| 2008/0118819 | A1 * | 5/2008 | Gamboa et al. | 429/61 |

FOREIGN PATENT DOCUMENTS

| | | |
|---|---|---|
| CN | 1815799 | 8/2006 |
| CN | 101304106 | 11/2008 |
| CN | 201210507 | 3/2009 |
| EP | 0 964 470 | 12/1998 |
| JP | 2001-155789 | 6/2001 |
| JP | 2001-313091 | 11/2001 |
| JP | 2002-373710 | 12/2002 |
| JP | 2003-109674 | 4/2003 |
| JP | 2006-278140 | 10/2006 |

OTHER PUBLICATIONS

European Search Report issued in European Application No. 09765338.0, dated Nov. 6, 2012.

* cited by examiner

NICKEL-HYDROGEN BATTERY PACK HEAT REMOVAL SYSTEM FOR HYBRID VEHICLE

This application is a national phase application under 35 U.S.C. §371 of International Patent Application No. PCT/CN2009/070171 filed Jan. 16, 2009 claims priority to Chinese patent application No. 200810069859.2 filed on Jun. 20, 2008. The entire text of each of the above-referenced disclosures are specifically incorporated herein by reference without disclaimer.

FIELD OF THE INVENTION

The present invention relates to automobile electronic application technology, in particular to a nickel-hydrogen battery pack heat removal system for hybrid vehicle.

BACKGROUND OF THE INVENTION

The power battery is an important control part in the hybrid vehicle system, the performance of which may directly affect the performance of vehicle. The power nickel-hydrogen battery becomes a preferred power supply for the hybrid-electric vehicle (HEV) due to its advantageous such as high energy density, high specific power, good repeating life, no environmental pollution and high safety. However, the problem of heat removal from the nickel-hydrogen battery when being charged is one of the main factors to affect the normal application of the nickel-hydrogen battery. With the elevated temperature, the discharge capacitance of the nickel-hydrogen battery is decreased, the charge efficiency is decreased, self-discharge is increased, and battery attenuation is accelerated. At high temperature, the temperature ununiformity of the nickel-hydrogen battery pack is increased. For a large nickel-hydrogen battery pack (e.g., for the electric vehicle), the problem of nonuniform heat removal of the battery pack cannot be solved by only taking such measures as battery design and composition proportioning adjustment. Thus, a cooling system is necessary for the battery pack, so as to achieve the heat monitoring and heat management of the battery pack, which is greatly significant for the long-term reliable operation of vehicle.

The conventional cooling manners include air cooling, liquid cooling, phase-change material cooling and so on. At present, the air cooling has become a relatively mature technology of heat removal of the battery.

The ventilation of the air cooling is generally performed in series or in parallel as shown in FIGS. 1 and 2, respectively.

In the serial ventilation manner shown in FIG. 1, cold air is flow in from the left side of the battery box, and out from the right side of the battery box. Since air is continuously heated in the course of flow, the cooling effect at the right side of the battery box is worse than that at the left side of the battery box, and the temperature of the battery pack in the battery box is increased gradually from left to right. The serial ventilation manner is adopted in Japanese hybrid vehicle such as Prius and Insight.

The parallel ventilation manner is shown in FIG. 2. If the flow rate is uniformly distributed, the temperature distribution of the battery pack may be relatively uniform. The parallel ventilation manner is adopted in the new Insight.

At present, many heat removal systems for the battery pack have been developed by researchers and producers to give attention to the cooling effect and the module temperature uniformity. The research emphases lie in how to balance the flow field conditions of the front and rear modules. Generally, the battery modules are arranged in staggered manner, and the structure of the battery pack is of wedge shape in the flow field direction, in order to balance the pressure in the flow field. Another method is to provide a V-shape guiding groove along the flow field such that the downstream area is gradually reduced so as to balance the pressure between the front portion and rear portion of the flow fields; and also guide the airflow towards the middle portion so as to balance the heat removal conditions between the peripheral portion and the central portion.

In the experiment of actual temperature filed of the cylinder battery in which the battery pack is cooled in parallel manner by air cooling, the temperature of the middle batteries is relatively high. For the design of the parallel ventilation structure, in order to achieve a favorable effect, wedge-shape air inlet/outlet passages and flow guiding passages must be properly designed. Due to the restricted space, for the concerned cylinder battery, it is very difficult to ensure the distribution consistency of the temperature field of the battery pack by the wedge-shape air inlet/outlet passages and flow guiding passages.

Therefore, how to solve the heat removal problem of the cylinder nickel-hydrogen battery for hybrid vehicle in order to ensure the temperature uniformity of the battery pack in use is a technical problem to be urgently solved by those skilled in the art.

SUMMARY OF THE INVENTION

The object of the present invention is to provide a nickel-hydrogen battery pack heat removal system for hybrid vehicle, which may solve the heat removal problem of the cylinder nickel-hydrogen battery for hybrid vehicle, and ensure the temperature uniformity of the battery pack in use.

The present provides a nickel-hydrogen battery pack heat removal system for hybrid vehicle, including a power battery pack (8), a battery support frame (9), a support bar (5), an air inlet (1), an air outlet (6) and a fan (7), wherein batteries in the power battery pack (8) are aligned in parallel in two layers one above the other in the battery support frame (9) of a battery box, the support bar (5) and the battery support frame (9) are respectively fixed on upper and lower soleplates of the battery box, the air inlet (1) is provided at one end of the battery box, the air outlet (6) is provided at the other end of the battery box, and the fan (7) is installed at the air outlet (6).

The system further includes circular arc-shaped baffle plates (2) disposed at opposite surfaces of the upper and lower batteries closest to the air inlet (1).

Preferably, the system further includes elongate baffle plates (3); and the elongate baffle plates (3) are disposed at the opposite surfaces of upper and lower batteries located between the circular arc-shaped baffle plates (2) and the middle portion of the battery box.

Preferably, the system further includes a diamond-shaped baffle plate with open middle passage (4) disposed between upper and lower batteries located between the middle portion of the battery box and the air outlet (6).

Preferably, the system includes at least one diamond-shaped baffle plate (4).

Preferably, the system further includes a diamond-shaped baffle plate (4') disposed between upper and lower batteries located at the air outlet (6).

Preferably, the system includes at least one diamond-shaped baffle plate (4').

Preferably, the circular arc-shaped baffle plates (2), the elongate baffle plates (3) and the diamond-shaped baffle plates (4, 4') are installed on the support bar (5).

Preferably, the system further includes a temperature sensor installed on the battery pack to collect ambient temperature and inner temperature of the battery box in which the battery pack is installed.

Preferably, the system further includes a signal processing unit. The signal processing unit receives the ambient temperature and the inner temperature of the battery box collected by the temperature sensor, and actuates or stops the fan (7) according to the comparison between the ambient temperature and the inner temperature of the battery box.

Preferably, in the power battery pack (8), the spacing between two adjacent columns of batteries located at the middle portion of the battery box is larger than that of other adjacent columns of batteries.

Compared with known related technology, the present invention has the following advantageous. For example, by disposing the circular arc-shaped baffle plates at the opposite surfaces of the two upper and lower batteries nearest to the air inlet, the cooling air is guided backwardly, so as to achieve the uniformity of flow fields in the front and rear modules of the battery pack. The design of the heat removal structure not only can ensure the uniformity of the temperature field of individual circular nickel-hydrogen batteries in the battery pack and the uniformity of the ventilation and heat removal of whole battery pack, but also has a simple structure, a convenient operation, a simple manufacture processes and a low cost.

The system according to the present invention may be adopted to solve the heat removal problem of the cylindrical nickel-hydrogen battery for hybrid vehicle, and ensure the uniformity of the temperature field of the battery pack in use, so as to improve the reliability and conformity of the performance of the batteries, improve the performance, repeating life and running security of the whole vehicle, and promote the industrialization development of the hybrid vehicle.

REFERENCE NUMERALS IN FIGURES

Figure 1:
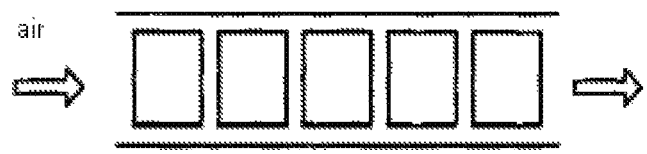
FIG. 1 is a schematic view of a conventional power battery pack for a hybrid vehicle, illustrating the serial ventilation manner.
Figure 2:
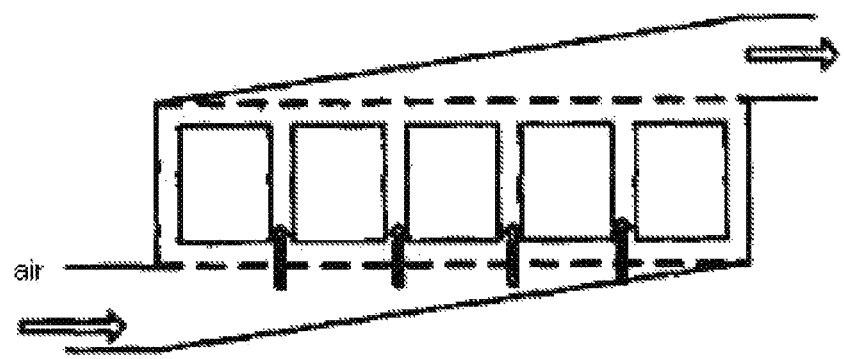
FIG. 2 is a schematic view of the conventional power battery pack for the hybrid vehicle, illustrating the parallel ventilation manner.

| | |
|---|---|
| 1 air inlet; | 2 circular arc-shaped baffle plate; |
| 3 elongate baffle plate; | 4 diamond-shaped baffle plate with open middle passage; |
| 5 support bar; | 4' diamond-shaped baffle plate without open middle passage; |
| 6 air outlet; | 7 fan; |
| 8 battery pack; | 9 battery support frame. |

DETAILED DESCRIPTION OF THE INVENTION

Hereinafter, the technical solutions of the present invention will be described in detailed by referring to the drawings.

Figure 3:
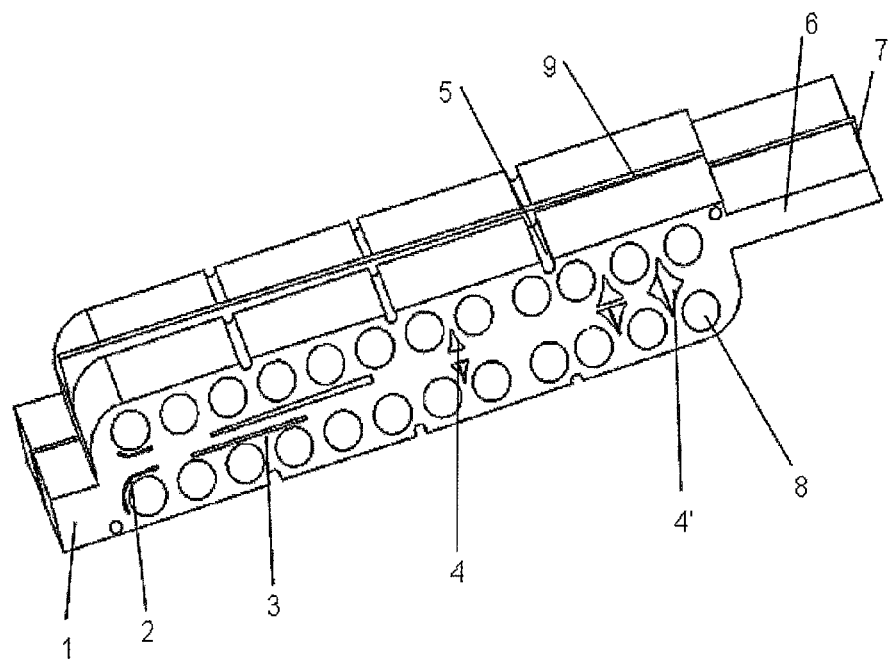
FIG. 3 is a schematic view of a nickel-hydrogen battery pack heat removal structure for hybrid vehicle according to the present invention.

As shown in FIG. 3, a schematic view of a nickel-hydrogen battery pack heat removal structure for hybrid vehicle according to the present invention is shown. Batteries in a battery pack 8 are aligned in parallel in two layers (rows) in a battery support frame 9 of the battery box. A support bar 5 and the battery support frame 9 are fixed on the outer surface of the battery box in order to fix and support the battery box. An air inlet 1 is provided at one end of the battery box, and an air outlet 6 is provided at the other end of the battery box.

Figure 4:
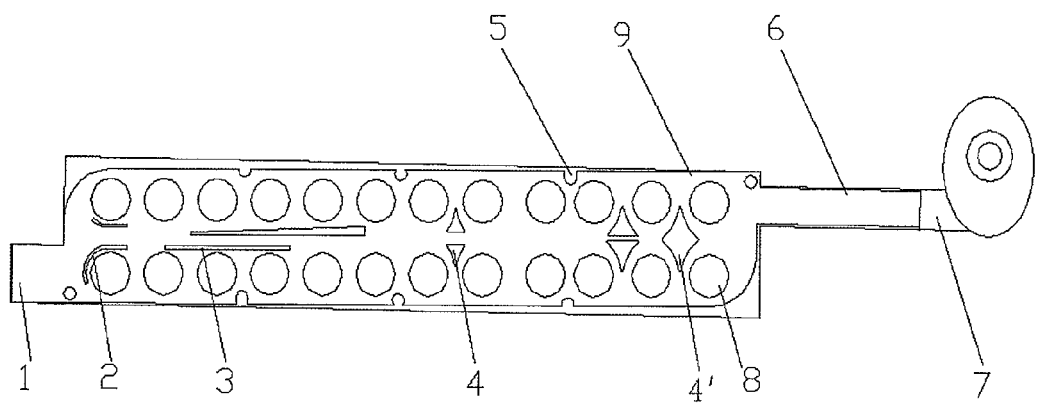
FIG. 4 is a cross-section view of the nickel-hydrogen battery pack heat removal system for hybrid vehicle according to the present invention.

As shown in FIG. 4, a cross-section view of the nickel-hydrogen battery pack heat removal system for hybrid vehicle according to the present invention is shown. An exhaust fan 7 is installed at the air outlet 6. Circular arc-shaped baffle plates 2 are respectively disposed at the opposite surfaces of the upper and lower batteries closest to the air inlet 1, and elongate baffle plates 3 are respectively disposed at the opposite surfaces of upper and lower batteries located between the circular arc-shaped baffle plates 2 and the middle portion of the battery box in order to obstruct and guide the cooling air. Furthermore, diamond-shaped baffle plates with open middle passage 4 are disposed between the upper and lower batteries located near the middle of the battery box and the upper and lower batteries located near the air outlet 6, respectively, so that the cooling passage is formed for respective batteries, and the cooling air may be guided towards rear batteries through the open middle passage. A diamond-shaped baffle plate without open middle passage 4' is disposed between the upper and lower batteries located at the air outlet 6 to guide the cooling air at the hindmost portion of the battery box. The circular arc-shaped baffle plates 2, the elongate baffle plates 3 and diamond-shaped baffle plates 4, 4' are installed on the support bar 5.

The number of the diamond-shaped baffle plates 4 and the diamond-shaped baffle plates 4' may be determined according to actual conditions.

The heat removal system further includes a battery pack temperature sensor. The temperature sensor is installed on the battery pack, and used to collect the ambient temperature and the inner temperature of the battery box in which the battery pack is installed, and then transmit temperature signals to a battery pack heat removal system signal processing unit. The battery pack heat removal system signal processing unit actuates or stops the fan 7 based on the comparison between the inner temperature of the battery box and the ambient temperature. The cooling air is introduced into system through the air inlet of the battery box, and flows through the circular arc-shaped baffle plates 2 into the battery pack. The air flowrate and the form of the flow field inside the battery pack may be determined by the arrangement of individual batteries, the shape and arrangement of the elongate baffle plates 3 and diamond-shaped baffle plates 4, 4' and the operation state of the fan 7. In the power battery pack, the spacing between the two adjacent columns of batteries located at the middle of the battery box is larger than that of other adjacent columns of batteries.

In the specific embodiment of the present invention, the direct current (DC) exhaust fan is the type of DC12V, and produces a differential pressure of 230 Pa, and has a rated current equal to or less than 8 A, to suction air and remove heat at the air outlet of the power battery pack for the hybrid vehicle.

The air inlet system of the battery pack according to the embodiment and the flow guiding structure disposed in the battery pack are a flow passage supporting frame. The support bar disposed at certain positions may play the role of guiding the flow along the air inlet passage. Since there are two layers of circular batteries and the length of each battery is relatively long, the temperature at the front of the battery pack is lower, and the temperature of the rear of the battery pack is higher. The circular arc-shaped baffle plates and the elongate baffle plates are arranged at the front of the battery pack and configured to guide cooling air backwards, meanwhile, to decrease and uniform the temperature at the front of the battery pack. The diamond-shaped baffle plates are arranged at the rear of the battery pack to uniformly remove the heat of the rear of the battery pack. By providing the circular arc-shaped baffle plates, the elongate baffle plates and the diamond-shaped baffle plates, the flow field and the temperature field in the battery box are uniformly distributed.

For the exhaust system, exhaust guiding structure and the air outlet suction system, the fan is actuated after receiving the actuating signal, and the cooling air is introduced into the air inlet passage, and flows through batteries, baffle plates and the spacing between batteries, so as to remove the heat of the batteries generated when charging and discharging, and hot air is gathered into air exhaust passage, and then discharged out of the box of the battery pack.

The design of the heat removal structure described in the present invention not only can ensure the uniformity of the temperature field and the ventilation and heat removal in the circular nickel-hydrogen battery pack, but also has a simple structure, a convenient operation, a simple manufacture processes and a low cost.

The system according to the present invention may be adopted to solve the heat removal problem of the cylindrical nickel-hydrogen battery for hybrid vehicle, and ensure the uniformity of the temperature field of the battery pack in use, so as to improve the reliability and conformity of the performance of the batteries, improve the performance, repeating life and running security of the whole vehicle, and promote the industrialization development of the hybrid vehicle.

As can be seen, in view of the requirements of power performance and economy of the hybrid vehicle and in view of the internal structure of the battery box, the present invention provides a more reasonable and optimized heat removal structure of the nickel-hydrogen battery for the hybrid vehicle according to the installation space limitation of the vehicle manufacturer and the structure modification limit of the battery suppliers.

The nickel-hydrogen battery pack heat removal system for hybrid vehicle according to the present invention has been described in detail, and the principle and embodiment of the present invention have been illustrated by specific examples. The above description to the examples is only used to help understand the method and spirit of the present invention. In addition, some modifications may be made to the specific embodiment and application scope by those skilled in the art according to the spirit of the present invention. Therefore, the contents of this description shouldn't be deemed to limit the present invention.

What is claimed is:

1. A nickel-hydrogen battery pack heat removal system for hybrid vehicle, comprising a power battery pack, a battery support frame, a support bar, an air inlet, an air outlet and a fan, wherein batteries in the power battery pack are aligned in parallel in two layers one above the other in the battery support frame of a battery box, the support bar and the battery support frame are respectively fixed on upper and lower soleplates of the battery box, the air inlet is provided at one end of the battery box, the air outlet is provided at the other end of the battery box, and the fan is installed at the air outlet, and wherein the system further comprises circular arc-shaped baffle plates disposed at opposite surfaces of the upper and lower batteries closest to the air inlet, and wherein the system further comprises elongate baffle plates, the elongate baffle plates are disposed at the opposite surfaces of upper and lower batteries located between the circular arc-shaped baffle plates and the middle portion of the battery box, and wherein the system further comprises a diamond-shaped baffle plate with a middle passage disposed between upper and lower batteries located between the middle portion of the battery box and the air outlet, the middle passage of the diamond-shaped baffle extending through the diamond-shaped baffle in a diagonal direction oriented towards the air outlet.

2. The system according to claim 1, wherein the system further comprises at least one diamond-shaped baffle plate without a middle passage.

3. The system according to claim 1, further comprising a diamond-shaped baffle plate disposed between upper and lower batteries located at the air outlet.

4. The system according to claim 3, wherein the diamond-shaped baffle plate disposed between upper and lower batteries located at the air outlet comprises at least one diamond-shaped baffle plate without a middle passage.

5. The system according to claim 3, wherein the circular arc-shaped baffle plates, the elongate baffle plates, the diamond-shaped baffle plate with a middle passage and the diamond-shaped baffle plate are installed on the support bar.

6. The system according to claim 3, further comprising a temperature sensor installed on the battery pack to collect ambient temperature and inner temperature of the battery box in which the battery pack is installed.

7. The system according to claim 6, further comprising a signal processing unit, wherein the signal processing unit receives the ambient temperature and the inner temperature of the battery box collected by the temperature sensor, and actuates or stops the fan according to the comparison between the ambient temperature and the inner temperature of the battery box.

8. The system according to claim 1, wherein in the power battery pack, the spacing between two adjacent columns of batteries located at the middle portion of the battery box is larger than that of other adjacent columns of batteries.

9. The system according to claim 2, wherein in the power battery pack, the spacing between two adjacent columns of batteries located at the middle portion of the battery box is larger than that of other adjacent columns of batteries.

10. The system according to claim 3, wherein in the power battery pack, the spacing between two adjacent columns of batteries located at the middle portion of the battery box is larger than that of other adjacent columns of batteries.

11. The system according to claim 4, wherein in the power battery pack, the spacing between two adjacent columns of batteries located at the middle portion of the battery box is larger than that of other adjacent columns of batteries.

12. The system according to claim 5, wherein in the power battery pack, the spacing between two adjacent columns of batteries located at the middle portion of the battery box is larger than that of other adjacent columns of batteries.

13. The system according to claim 6, wherein in the power battery pack, the spacing between two adjacent columns of batteries located at the middle portion of the battery box is larger than that of other adjacent columns of batteries.

14. The system according to claim 7, wherein in the power battery pack, the spacing between two adjacent columns of batteries located at the middle portion of the battery box is larger than that of other adjacent columns of batteries.

* * * * *